US012571445B2

(12) United States Patent
Baek et al.

(10) Patent No.: US 12,571,445 B2
(45) Date of Patent: ***Mar. 10, 2026

(54) ELECTROMECHANICAL BRAKE AND METHOD OF OPERATING THE SAME

(71) Applicant: HL MANDO CORPORATION, Gyeonggi-do (KR)

(72) Inventors: Seungtae Baek, Gyeonggi-do (KR); Joon-kyu Song, Gyeonggi-do (KR); Kyungho Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 453 days.

This patent is subject to a terminal disclaimer.

(21) Appl. No.: 18/008,326

(22) PCT Filed: Jun. 4, 2021

(86) PCT No.: PCT/KR2021/007043
§ 371 (c)(1),
(2) Date: Dec. 5, 2022

(87) PCT Pub. No.: WO2021/246829
PCT Pub. Date: Dec. 9, 2021

(65) Prior Publication Data
US 2023/0287949 A1 Sep. 14, 2023

(30) Foreign Application Priority Data
Jun. 5, 2020 (KR) ........................ 10-2020-0068537

(51) Int. Cl.
*F16D 65/66* (2006.01)
*B60T 1/06* (2006.01)
(Continued)

(52) U.S. Cl.
CPC .............. *F16D 65/66* (2013.01); *B60T 1/065* (2013.01); *B60T 8/17* (2013.01); *B60T 13/746* (2013.01);
(Continued)

(58) Field of Classification Search
CPC .... F16D 65/567; F16D 65/66; F16D 2125/40; F16D 2125/405; B60T 1/065; B60T 8/17; B60T 13/746; B60T 17/22
See application file for complete search history.

(56) References Cited

U.S. PATENT DOCUMENTS 4,392,557 A * 7/1983 Franke ................... F16D 65/18
188/71.9
5,086,884 A 2/1992 Gordon et al.
(Continued)

FOREIGN PATENT DOCUMENTS

DE 10 2011 080 714 12/2012
JP 1-299328 12/1989
(Continued)

OTHER PUBLICATIONS

International Search Report for PCT/KR2021/007043 mailed on Sep. 24, 2021 and its English Machine Translation by the WIPO (now published as WO 2021/246829).
(Continued)

*Primary Examiner* — Nicholas J Lane
(74) *Attorney, Agent, or Firm* — WOMBLE BOND DICKINSON (US) LLP

(57) ABSTRACT

Disclosed is an electromechanical brake and a method of operating the same. In accordance with an aspect of the disclosure the electromechanical brake includes a piston configured to advance and retreat to press a brake pad; a power transmission unit configured to receive a driving force from an actuator to convert a rotational motion into a
(Continued)

linear motion, and provide the converted driving force to the piston; and a position adjustment unit configured to adjust a relative position of the piston with respect to the power transmission unit; wherein the power transmission unit includes a spindle rotating by receiving the driving force from the actuator, and a nut connected to the spindle and moving forward or backward an inside of the piston by rotation of the spindle in a first direction or a second direction to advance and retreat the piston, wherein the position adjustment unit includes an adjusting screw provided on an outer side of the nut and rotating together with the nut, a first screw thread formed on an outer circumferential surface of the adjusting screw, a second screw thread formed on an inner circumferential surface of the piston and meshing with the first screw thread, and an adjuster provided between the spindle and the nut and configured to rotate the nut and the adjusting screw in the first direction or the second direction by rotation of the spindle to advance and retreat the relative position of the piston.

14 Claims, 13 Drawing Sheets

(51) Int. Cl.

| | |
|---|---|
| *B60T 8/17* | (2006.01) |
| *B60T 13/74* | (2006.01) |
| *B60T 17/22* | (2006.01) |
| *F16D 55/226* | (2006.01) |
| *F16D 65/18* | (2006.01) |
| *F16D 66/00* | (2006.01) |
| *F16D 121/24* | (2012.01) |
| *F16D 125/40* | (2012.01) |
| *F16D 127/02* | (2012.01) |

(52) U.S. Cl.
CPC ............ *B60T 17/22* (2013.01); *F16D 55/226* (2013.01); *F16D 65/18* (2013.01); *F16D 66/00* (2013.01); *F16D 2066/005* (2013.01); *F16D 2121/24* (2013.01); *F16D 2125/40* (2013.01); *F16D 2127/02* (2013.01)

(56) References Cited

U.S. PATENT DOCUMENTS

| | | | | |
|---|---|---|---|---|
| 2016/0355169 A1* | 12/2016 | Ohlig | .................... | B60T 13/741 |
| 2019/0331180 A1* | 10/2019 | Chelaidite | .............. | F16H 25/24 |
| 2022/0235839 A1* | 7/2022 | Baek | .................... | B60T 13/741 |
| 2022/0242384 A1* | 8/2022 | Baek | .................... | B60T 17/221 |
| 2022/0260125 A1* | 8/2022 | Tarandek | ............. | F16D 65/567 |
| 2023/0258237 A1* | 8/2023 | Park | ..................... | B60T 13/741 |
| | | | | 188/71.1 |
| 2023/0287949 A1* | 9/2023 | Baek | .................... | B60T 13/746 |

FOREIGN PATENT DOCUMENTS

| | | |
|---|---|---|
| JP | 2739955 | 4/1998 |
| JP | 2000-283195 | 10/2000 |
| JP | 2005-233224 | 9/2005 |
| KR | 10-1511437 | 4/2015 |
| KR | 10-2017-0035044 | 3/2017 |
| KR | 10-2017-0124741 | 11/2017 |

OTHER PUBLICATIONS

Written Opinion of the International Searching Authority for PCT/KR2021/007043 mailed on Sep. 24, 2021 and its English Machine Translation by Google Translate (now published as WO 2021/246829).

Office Action (1st) dated Feb. 24, 2025 for Korean Patent Application No. 10-2020-0068537 and its English translation provided by Applicant's foreign counsel.

Office Action dated Nov. 24, 2025 for German Patent Application No. 11 2021 003 143.0 and its English translation provided by Applicant's foreign counsel.

* cited by examiner

【FIG. 1】
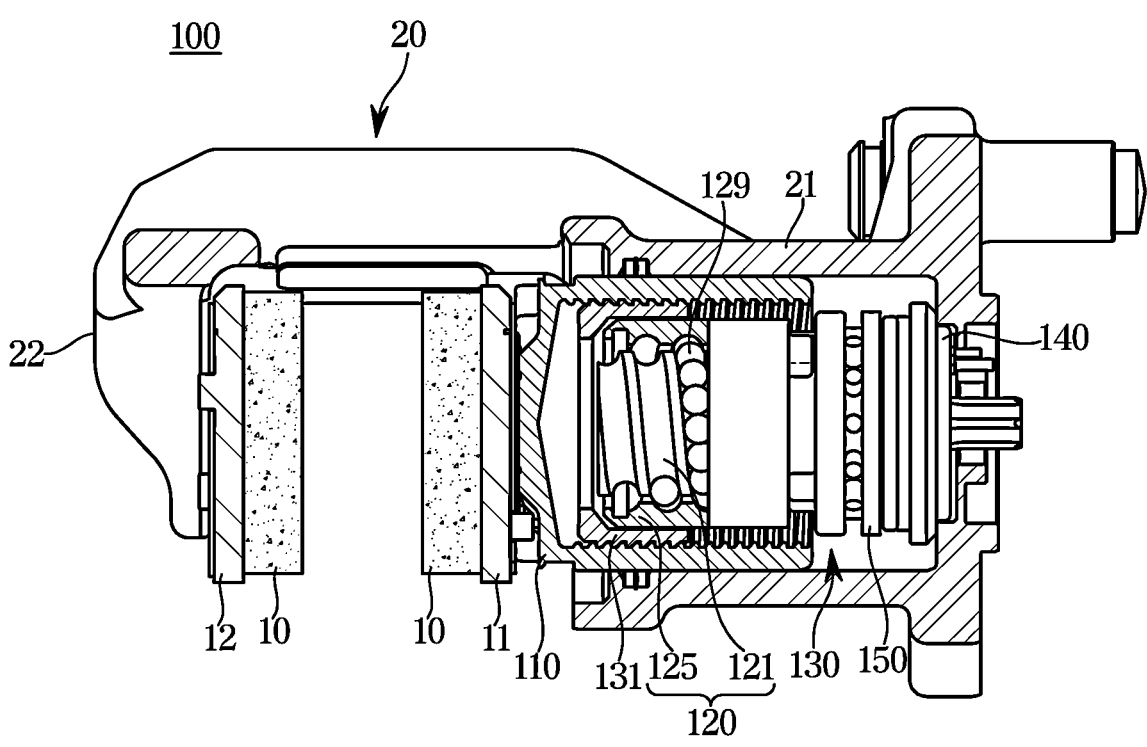

【FIG. 2】
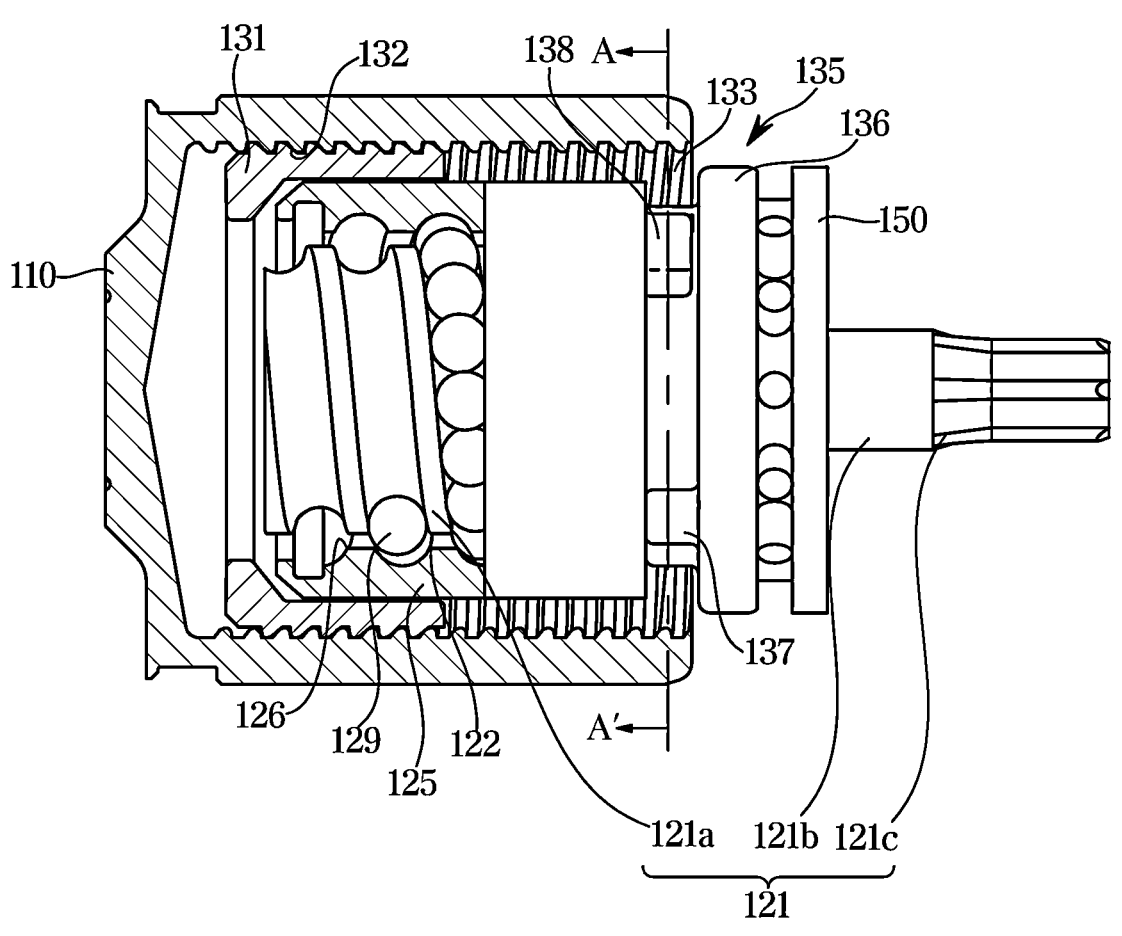

[FIG. 3]
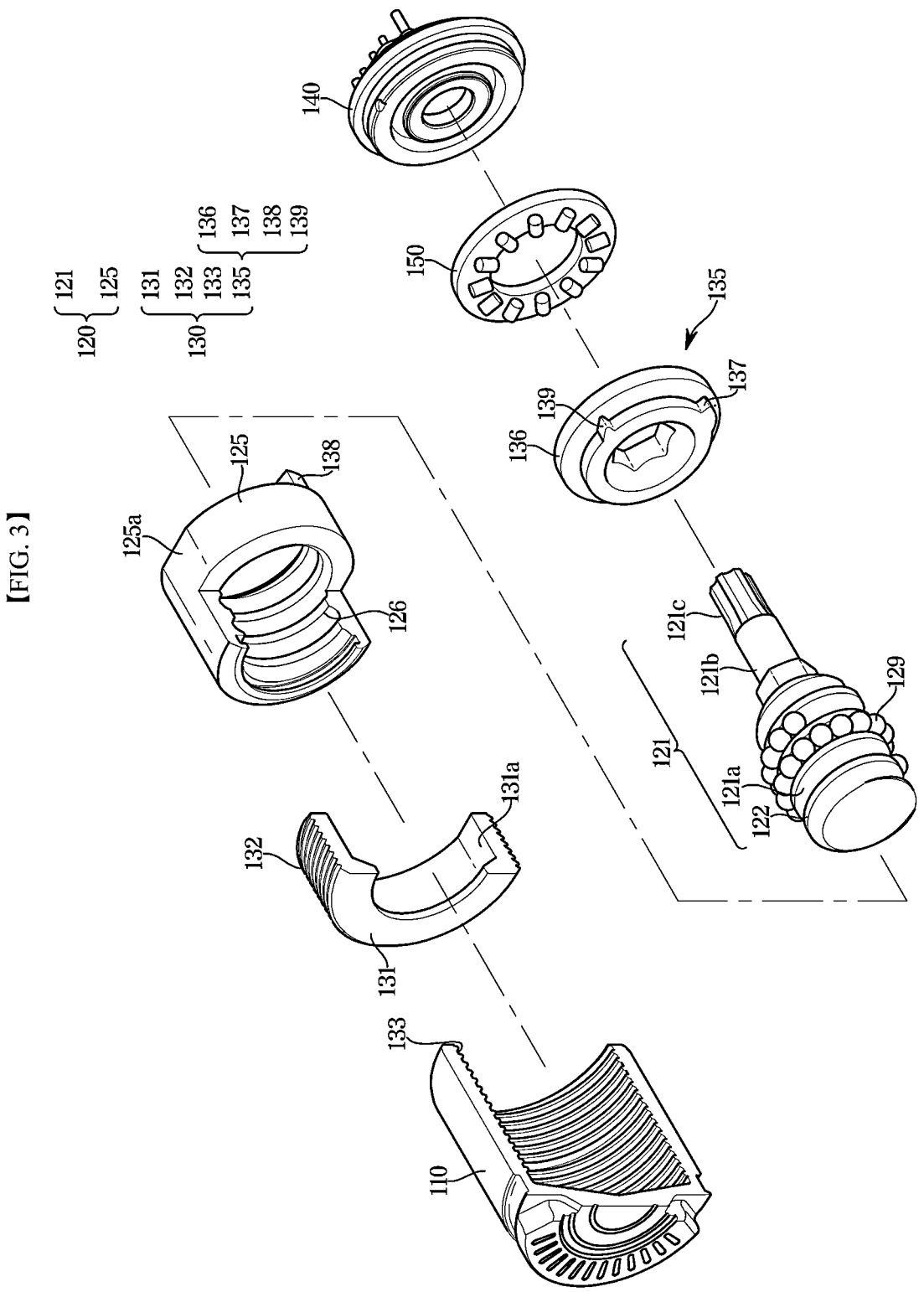

【FIG. 4】
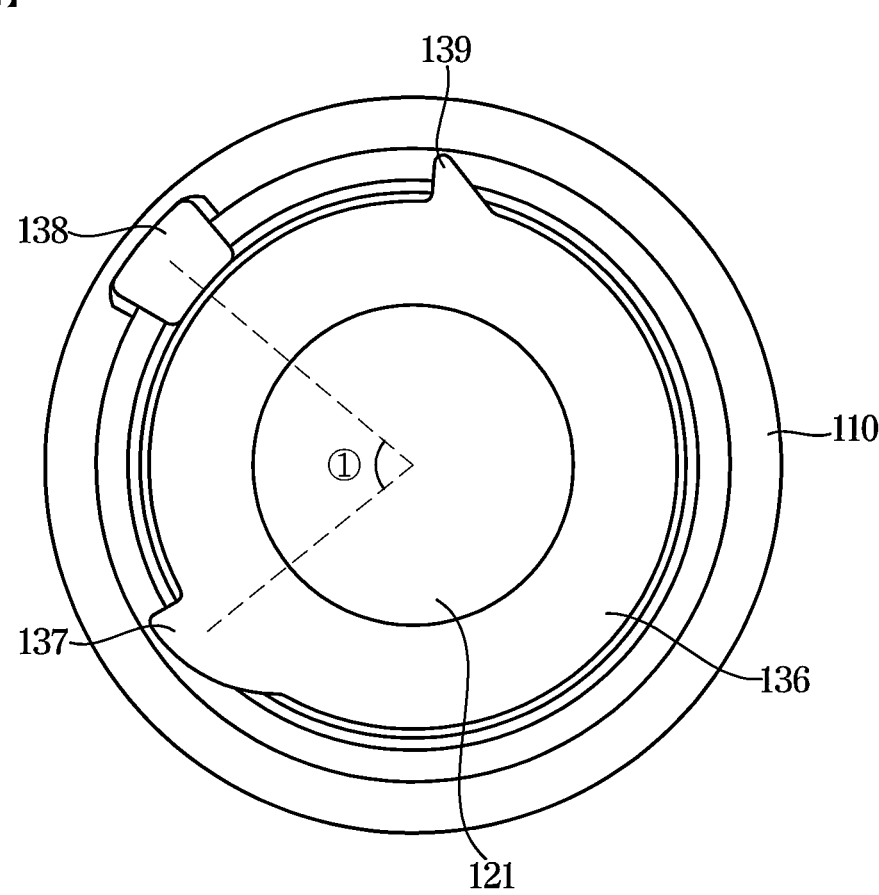

【FIG. 5】
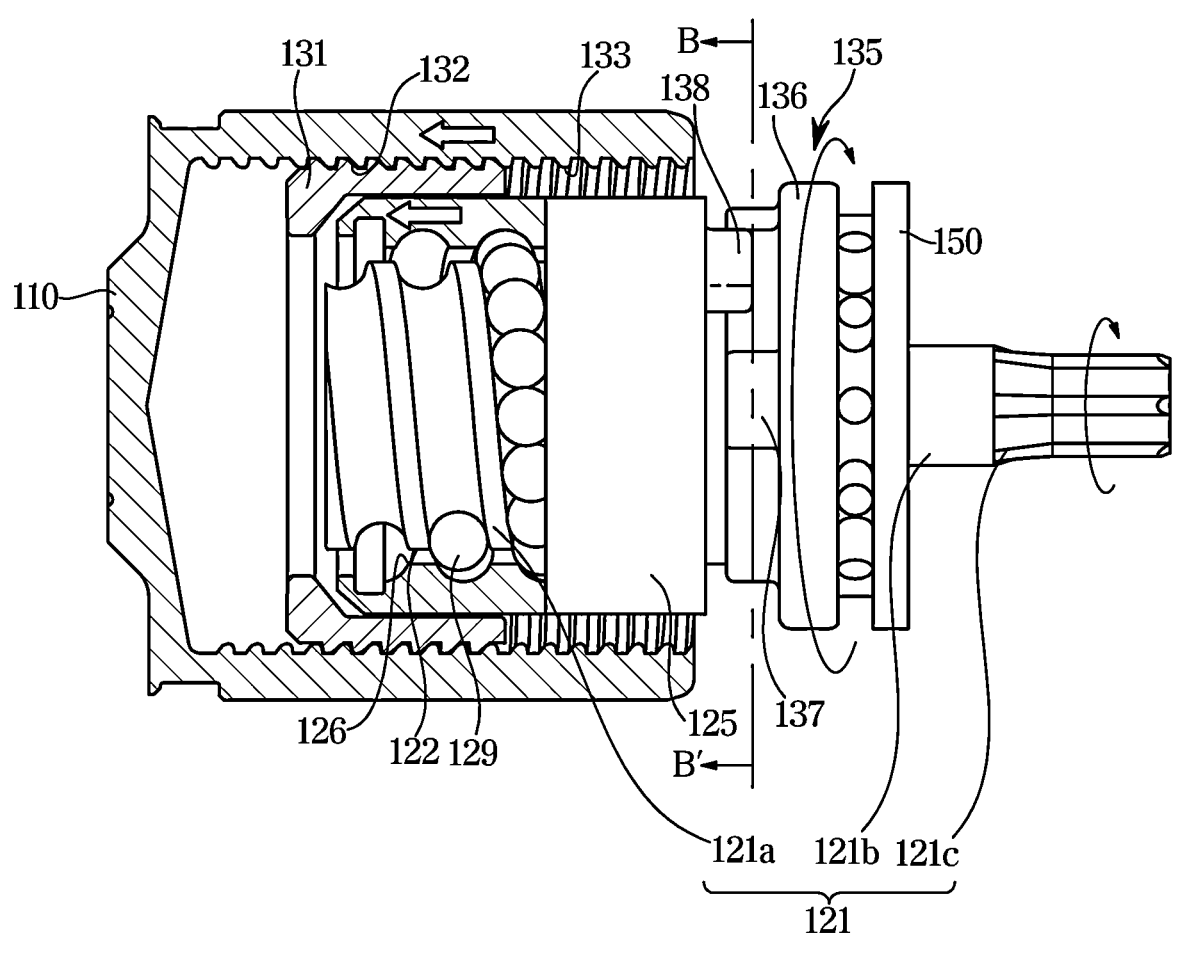

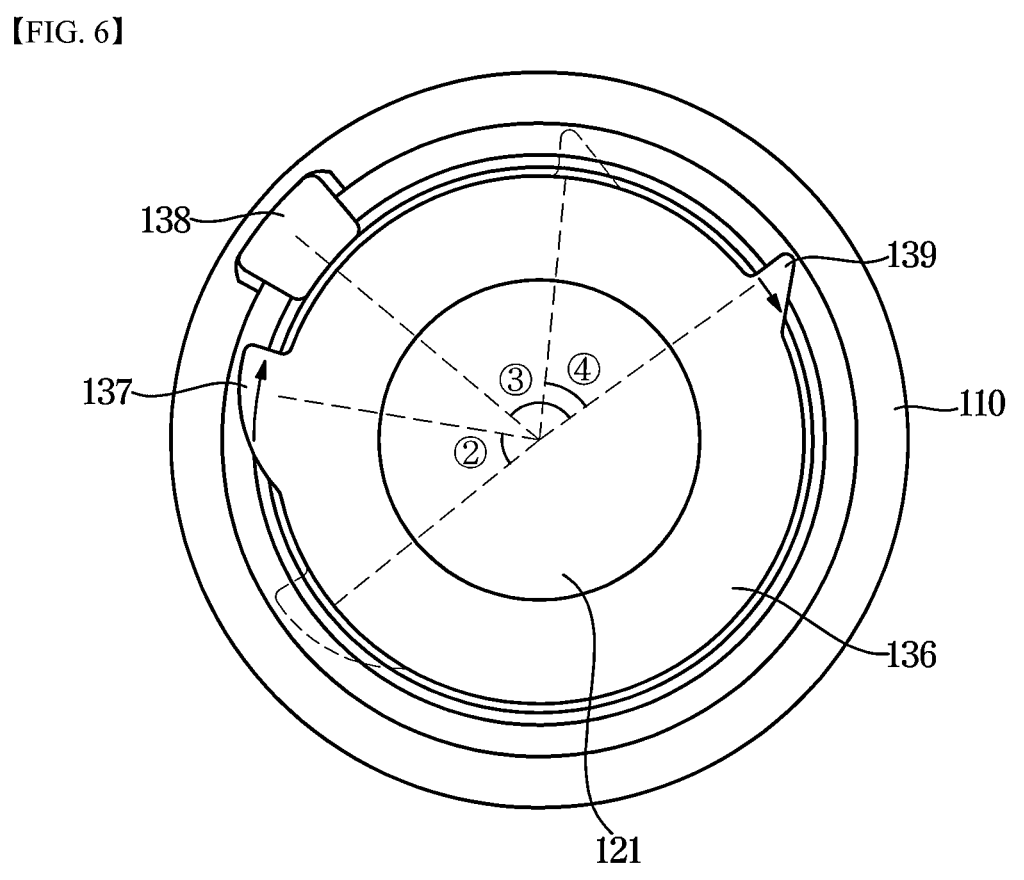

【FIG. 6】

【FIG. 7】
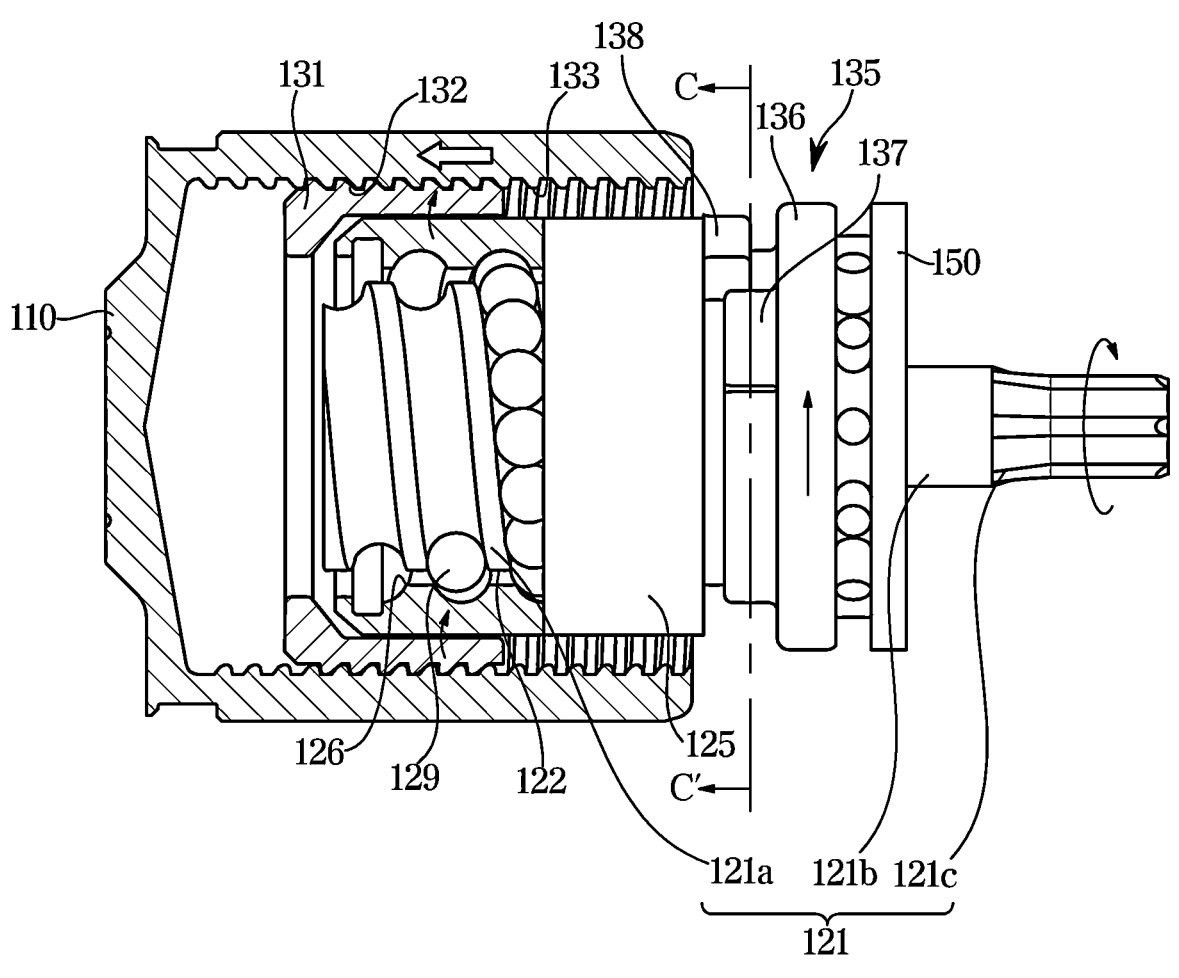

【FIG. 8】
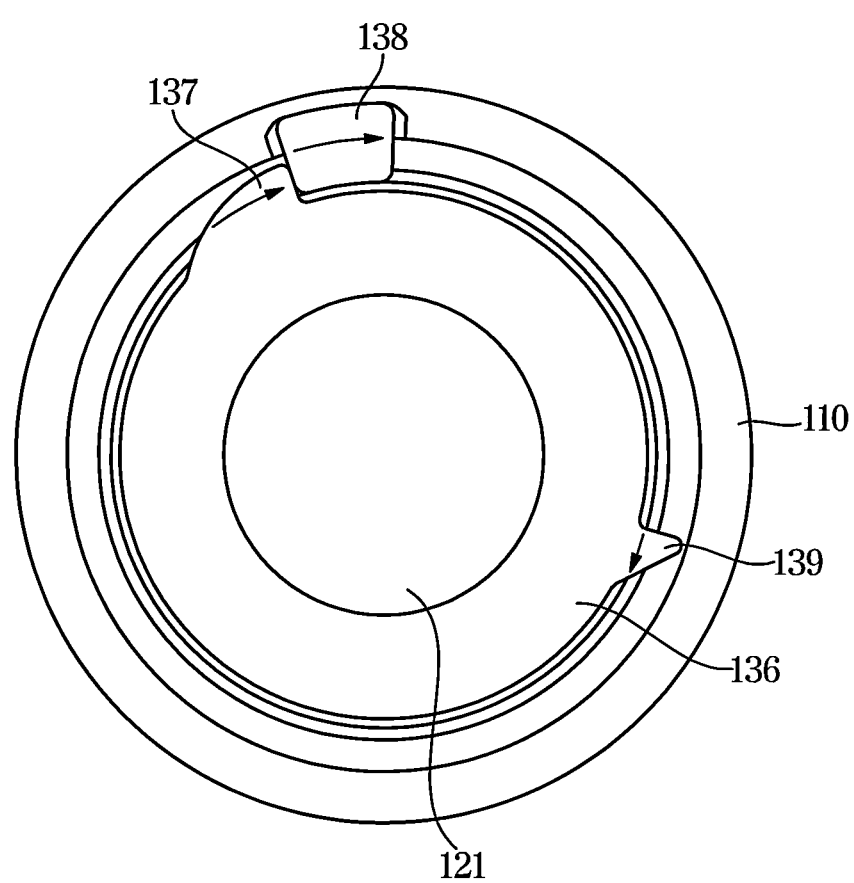

【FIG. 9】
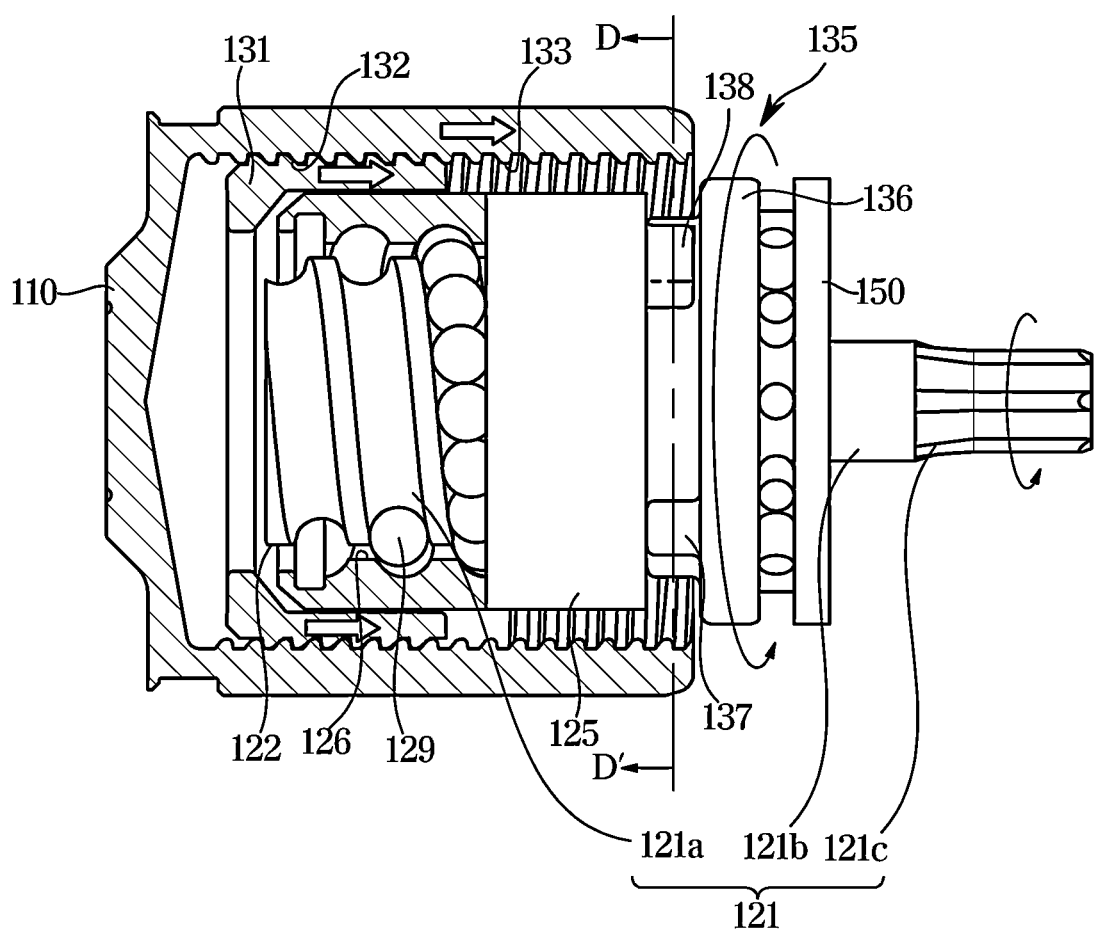

【FIG. 10】
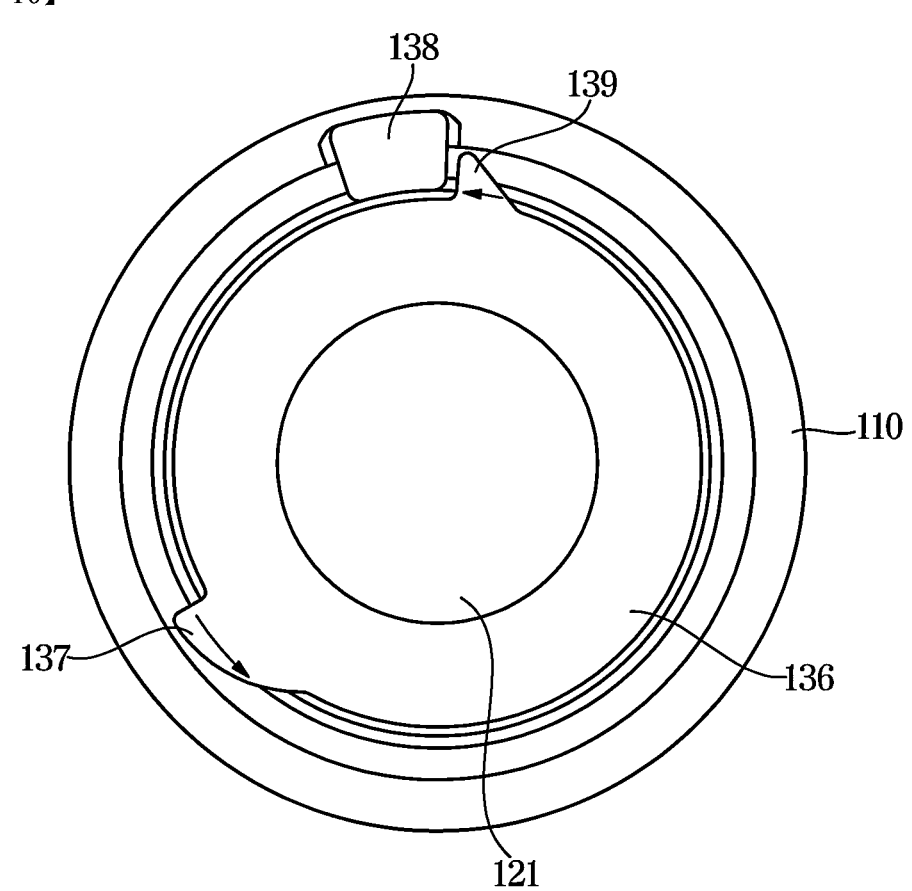

【FIG. 11】
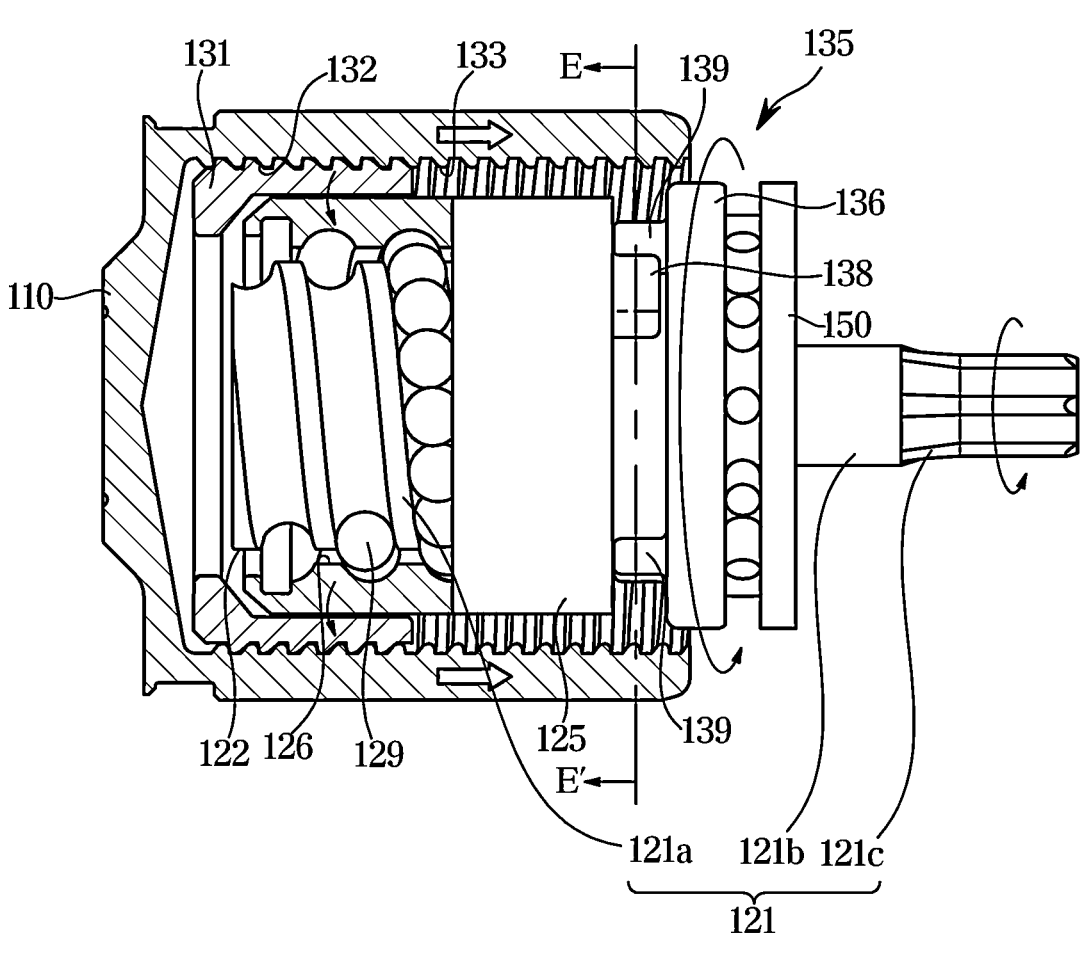

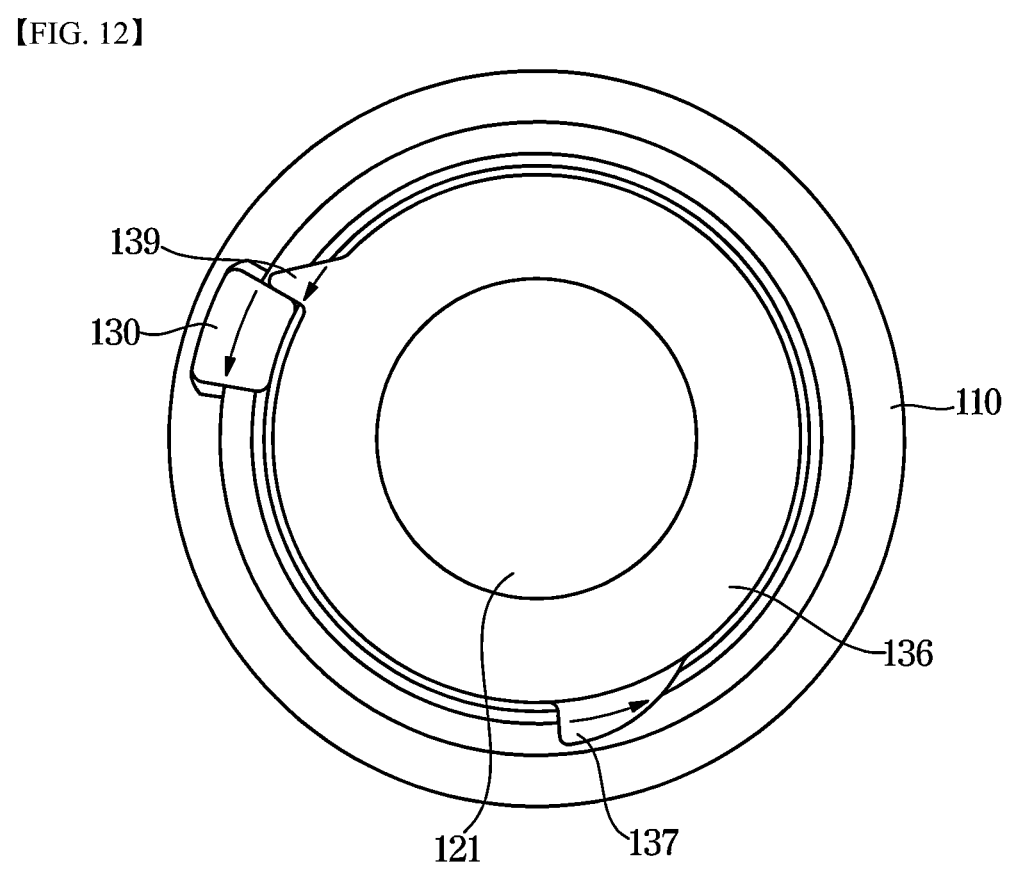

【FIG. 12】

【FIG. 13】
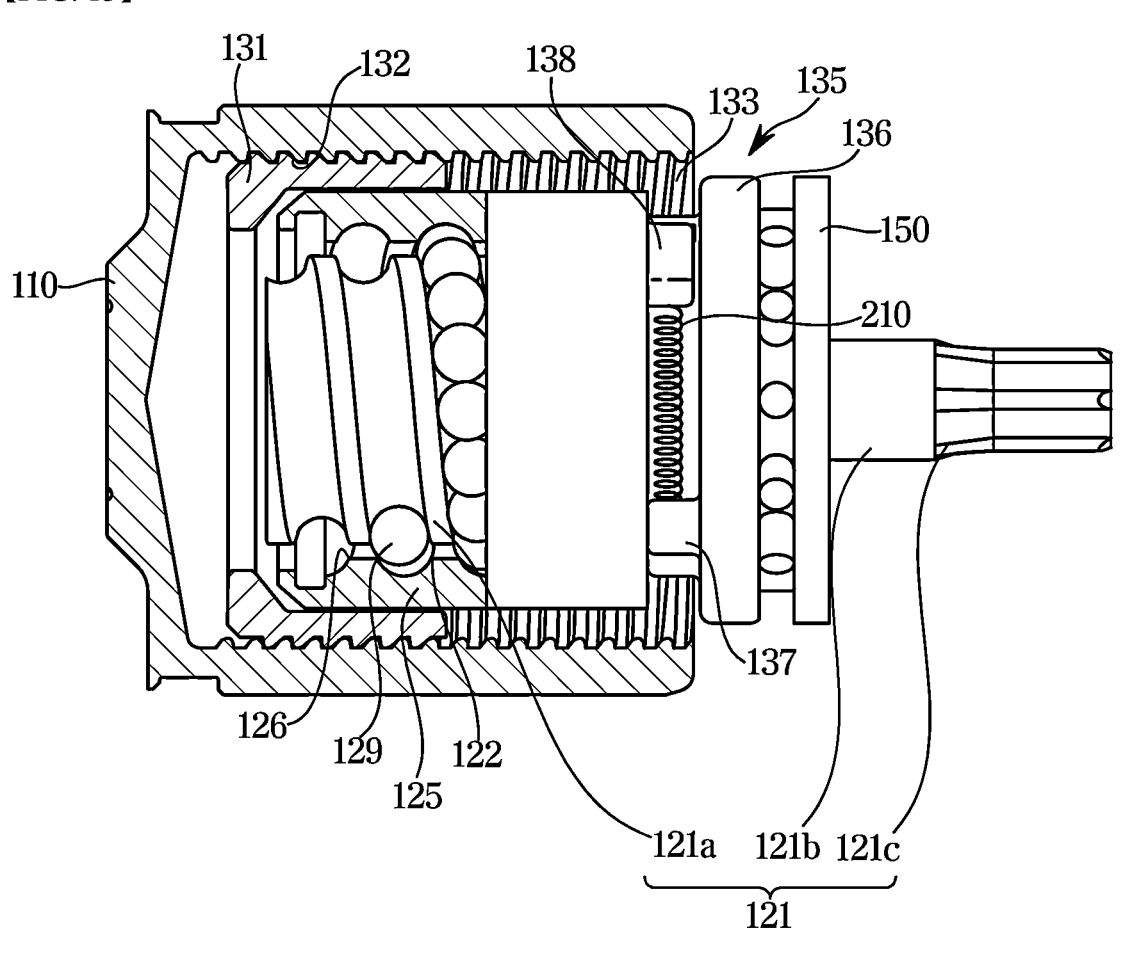

ELECTROMECHANICAL BRAKE AND METHOD OF OPERATING THE SAME

TECHNICAL FIELD

The present disclosure relates to an electromechanical brake and a method of operating the same, and more particularly, to an electromechanical disc brake for realizing braking of a vehicle using a rotational driving force of a motor and a method of operating the same.

BACKGROUND ART

Generally, a vehicle is essentially equipped with a brake system for performing braking, and various types of brake systems have been proposed for a safety of a driver and passenger.

Conventional brake systems mainly use a method of supplying hydraulic pressure required for braking to a wheel cylinder using a mechanically connected booster when a driver depresses a brake pedal. However, nowadays, as a next-generation brake system, development of an electromechanical brake system that receives a driver's intention to brake as an electric signal and operates an electric device such as a motor based on the electric signal to provide braking power to a vehicle has been ongoing.

Such electromechanical brake systems convert rotational force of a motor into linear motion through a motor and a speed reducer to provide a clamping pressure to a brake disc, thereby performing a service brake and a parking brake of the vehicle.

On the other hand, brake pads that directly contact and press a brake disc of a vehicle are gradually abraded according to the repeated braking operation of a vehicle. To maintain braking performance of a vehicle despite wear of brake pads, implement of compensating for the wear of brake pads is required. However, in this case, applicability of a vehicle decreases due to an increase in a size or axial length of a brake system.

DISCLOSURE

Technical Problem

An aspect of the disclosure is to provide an electromechanical brake system capable of maintaining and improving braking performance of a vehicle despite wear of brake pads, and a method of operating the same.

Another aspect of the disclosure is to provide an electromechanical brake system capable of stably braking a vehicle in various operating conditions of the vehicle, and a method of operating the same.

Another aspect of the disclosure is to provide an electromechanical brake system capable of reducing size and weight to improve applicability of a vehicle and to promote space utilization of a vehicle, and a method of operating the same.

Another aspect of the disclosure is to provide an electromechanical brake system capable of easily compensating for wear of brake pads with a simple structure, and a method of operating the same.

Another aspect of the disclosure is to provide an electromechanical brake system capable of improving braking performance by reducing a drag phenomenon and suppressing braking noise and vibration, and a method of operating the same.

Technical Solution

In accordance with an aspect of the present disclosure, an electromechanical brake includes a piston configured to advance and retreat to press a brake pad; a power transmission unit configured to receive a driving force from an actuator to convert a rotational motion into a linear motion, and provide the converted driving force to the piston; and a position adjustment unit configured to adjust a relative position of the piston with respect to the power transmission unit; wherein the power transmission unit includes a spindle rotating by receiving the driving force from the actuator, and a nut connected to the spindle and moving forward or backward an inside of the piston by rotation of the spindle in a first direction or a second direction to advance and retreat the piston, wherein the position adjustment unit includes an adjusting screw provided on an outer side of the nut and rotating together with the nut, a first screw thread formed on an outer circumferential surface of the adjusting screw, a second screw thread formed on an inner circumferential surface of the piston and meshing with the first screw thread, and an adjuster provided between the spindle and the nut and configured to rotate the nut and the adjusting screw in the first direction or the second direction by rotation of the spindle to advance and retreat the relative position of the piston.

The adjuster may include a flange extending radially on an outer circumferential surface of the spindle, a first protrusion protruding from the flange, and a second protrusion protruding from the nut and configured to induce and generate the first direction rotation of the nut and the adjusting screw by being caught by the first protrusion when the spindle rotates in the first direction, thereby advancing the relative position of the piston.

A first angle between the first projection and the second projection in a braking release state of a vehicle may be provided to be greater than a second angle at which the first protrusion rotates from the braking release state to a braking state of the vehicle.

The adjuster may further include a third protrusion protruding from the flange, wherein the second protrusion is configured to induce the second direction rotation of the nut and the adjusting screw by being caught by the third protrusion when the spindle rotates in the second direction, thereby retreating the relative position of the piston.

A third angle between the second protrusion and the third protrusion in a braking state of the vehicle may be provided to be greater than a fourth angle at which the third protrusion rotates from the braking state to the braking release state of the vehicle.

The nut may include an internal thread formed on an inner circumferential surface thereof, the spindle may include a first end on one side of which an external thread meshing with the internal thread is formed on the outer circumferential surface thereof, a second end on the other side connected to the actuator, and a central portion disposed between the first end and the second end, and the flange may be fixedly installed on an outer circumferential surface of the central portion.

The first protrusion and the third protrusion are formed to protrude to be spaced apart from each other on a front surface of the flange opposite to the nut, and the second protrusion is formed to protrude from an rear surface of the nut opposite to the front surface of the flange.

The adjusting screw may be provided in a hollow cylindrical shape to surround a portion of an outer side of the nut, and each of the adjusting screw and the nut is provided with anti-rotation surface in which at least a portion of a part in contact with each other is provided as a flat surface.

The electromechanical brake may further include a release spring has one end supported by the first protrusion and the other end supported by the second protrusion, the release spring configured to be compressed by the first direction rotation of the spindle.

The electromechanical brake may further include an electronic control unit configured to control operation of the actuator; and a detection unit configured to detect an engaging force between the brake pad and the disk rotating together with a wheel.

In accordance with another aspect of the present disclosure, a method of operating the electromechanical brake may include, in response to that the engaging force between the disc and the brake pad detected by the detection unit in a braking state of the vehicle is less than a predetermined value, determining, by the electronic control unit, that wear of the brake pad presents, and entering, by the electronic control unit, a first mode for advancing the relative position of the piston.

The method may further include, in response to that the engaging force between the disc and the brake pad detected by the detection unit in a braking release state of the vehicle is greater than a predetermined value, determining, by the electronic control unit, that the a drag presents, and entering, by the electronic control unit, a second mode for retreating the relative position of the piston.

The method may further include, in the first mode, by the electronic control unit, controlling the operation of the actuator to rotate the spindle in a first direction from a braking release state of the vehicle to a braking state of the vehicle, generating an additional first direction rotation of the spindle to cause the first projection to be rotated while contacting with the second projection, thereby inducing the first direction rotation of the nut and the adjusting screw, and advancing the relative position of the piston with respect to the nut by the first direction rotation of the adjusting screw.

The method may further include, after the first mode, returning, by the electronic control unit, the spindle or the first protrusion to its original position of the braking release state of the vehicle.

The method may further include, in the second mode, by the electronic control unit, controlling the operation of the actuator to rotate the spindle in a second direction from a braking state of the vehicle to a braking release state of the vehicle, generating an additional second direction rotation of the spindle to cause the third projection to be rotated while contacting with the second projection, thereby inducing the second direction rotation of the nut and the adjusting screw, and retreating the relative position of the piston with respect to the nut by the second direction rotation of the adjusting screw.

Advantageous Effects

An embodiment of disclosure may provide an electromechanical brake system capable of maintaining and improving braking performance of a vehicle despite wear of brake pads, and a method of operating the same.

Further, an embodiment of disclosure may provide an electromechanical brake system capable of stably braking a vehicle in various operating conditions of the vehicle, and a method of operating the same.

Further, an embodiment of disclosure may provide an electromechanical brake system capable of reducing size and weight to improve applicability of a vehicle and to promote space utilization of a vehicle, and a method of operating the same.

Further, an embodiment of disclosure may provide an electromechanical brake system capable of easily compensating for wear of brake pads with a simple structure, and a method of operating the same.

Further, an embodiment of disclosure may provide an electromechanical brake system capable of improving braking performance by reducing a drag phenomenon and suppressing braking noise and vibration, and a method of operating the same.

DESCRIPTION OF DRAWINGS

FIG. 1 is a lateral cross-sectional view illustrating an electromechanical brake according to an embodiment of the disclosure.

FIG. 2 is a lateral cross-sectional view illustrating an enlarged main part of an electromechanical brake according to an embodiment of the disclosure.

FIG. 3 is an exploded perspective view illustrating the main part of the electromechanical brake according to the embodiment of the disclosure.

FIG. 4 is a cross-sectional view taken along A-A' direction of FIG. 2, illustrating positions of first, second, and third projections in a before braking state of a vehicle or a braking release state of a vehicle.

FIG. 5 is a lateral cross-sectional view illustrating an operation of the electromechanical brake according to an embodiment of the disclosure in a braking state of a vehicle.

FIG. 6 is a cross-sectional view taken along B-B' direction of FIG. 5, illustrating positions of the first, second, and third projections in the braking state of the vehicle.

FIG. 7 is a lateral cross-sectional view illustrating an operation of the electromechanical brake according to an embodiment of the disclosure in a first mode state for compensating for wear of brake pads.

FIG. 8 is a cross-sectional view taken along C-C' direction of FIG. 7, illustrating positions of the first, second, and third protrusions in the first mode state.

FIG. 9 is a lateral cross-sectional view illustrating an operation of the electromechanical brake according to an embodiment of the disclosure in the braking release state of the vehicle after the first mode.

FIG. 10 is a cross-sectional view taken along D-D' direction of FIG. 9, illustrating positions of the first, second, and third projections disclosure in the braking release state of the vehicle after the first mode.

FIG. 11 is a lateral cross-sectional view illustrating an operation of the electromechanical brake according to an embodiment of the disclosure in a second mode for reducing drag.

FIG. 12 is a cross-sectional view taken along E-E' direction of FIG. 11, illustrating positions of the first, second, and third protrusions in the second mode.

FIG. 13 is a lateral cross-sectional view illustrating an enlarged main part of an electromechanical brake according to a modified embodiment of the disclosure.

MODES OF THE INVENTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts correspond-
ing to technical aspects of the disclosure on the basis of the
principle that the inventor is allowed to define terms appro-
priately for the best explanation. Therefore, the description
proposed herein is just a preferable example for the purpose
of illustrations only, not intended to limit the scope of the
disclosure, so it should be understood that other equivalents
and modifications could be made thereto without departing
from the spirit and scope of the disclosure.

FIG. 1 is a lateral cross-sectional view illustrating an
electromechanical brake 100 according to an embodiment of
the disclosure.

Referring to FIG. 1, an electromechanical brake 100
according to an embodiment of the disclosure may include
a carrier (not shown) on which a pair of pad plates 11 and
12 are installed to press a disk (not shown) rotating together
with a wheel of a vehicle, a caliper housing 20 that is
slidably installed on the carrier to operate the pair of pad
plates 11 and 12, a piston 110 that is installed to move
forward and backward inside the caliper housing 20, an
actuator (not shown) that generates and provides a driving
force for moving the piston 110, a power transmission unit
120 that realizes forward and backward movement of the
piston 110 in an axial direction by converting rotational
driving force provided from the actuator into linear motion
to transmit to the piston 110, a position adjustment unit 130
that compensates for wear of brake pads 10 or reducing drag
phenomenon by adjusting a relative position of the piston
110 with respect to the power transmission unit 120, a
detection unit 140 that detects adhesion force between the
disk 10 and the brake pads 10 or engaging force of the brake
pads 10, and an electronic control unit (not shown, ECU)
that controls an operation of the actuator based on informa-
tion provided from the detection unit 140.

The pair of pad plates 11 and 12 is provided with the brake
pad 10 attached to an inner surface thereof, respectively. The
pair of pad plates 11 and 12 have the inner pad plate 11
disposed so that an outer surface thereof is in contact with
a front surface (a left surface based on FIG. 1) of the piston
110, and the outer pad plate 12 disposed so that an outer
surface thereof is in contact with a finger part 22 of the
caliper housing 20. The pair of pad plates 11 and 12 is
slidably installed on the carrier.

The caliper housing 20 includes the finger part 22 for
operating the outer pad plate 12 and a cylinder part 21 in
which the piston 110 is installed, and is slidably fastened to
the carrier. When the vehicle is a braking operation, the
caliper housing 20 slides from the carrier by a reaction force
caused by the movement of the piston 110 and approaches
the disk, and in turn the outer pad plate 12 by the finger part
22 approaches the disk side, thereby pressing the disk.

FIGS. 2 and 3 are lateral cross-sectional and exploded
perspective views illustrating enlarged main part of the
electromechanical brake 100 according to an embodiment of
the embodiment. Referring to FIGS. 1 to 3, the piston 110
may be provided in a cup shape in which a rear side thereof
(a right side based on FIGS. 1 and 2) is opened, and is
slidably inserted inside the cylinder part 21. Furthermore,
the piston 110 may receive power through the actuator (not
shown) and the power transmission unit 120 to be described
later and press the inner pad plate 11 against the disk side.
A second screw thread 133 that meshes with a first screw
thread 132 formed on an outer circumferential surface of an
adjusting screw 131 to be described later may be formed on
an inner circumferential surface of the piston 110. An
operation of adjusting a relative position of the piston 110 with respect to a spindle 121 or a nut 125 by the position
adjustment unit 130 will be described later with reference to
FIGS. 4 to 12.

The power transmission unit 120 may include the spindle
121 that rotates by receiving a driving force from the
actuator, the nut 125 that is disposed inside the piston 110
and is screw-coupled to the spindle 121 to move forward
together with the piston 110 by a first direction rotation of
the spindle 121 or to move backward together with the
piston 110 by a second direction rotation of the spindle 121,
and a plurality of balls 129 interposed between the spindle
121 and the nut 125. The power transmission unit 120 may
be provided as a ball-screw type transmission device that
converts a rotational motion of the spindle 121 into a linear
motion.

Here, the first direction rotation of the spindle 121 refers
to a rotation direction in which the nut 125 is advanced by
the rotation of the spindle 121, and the second direction
rotation of the spindle 121 refers to a rotation direction in
which the nut 125 is retracted by the rotation of the spindle
121 as rotation in a direction opposite to the first direction.

The spindle 121 includes a first end 121a on one side of
which an external thread 122 is formed on an outer circum-
ferential surface thereof, a second end 121c on the other side
connected to the actuator to receive the driving force, and a
central portion 121b disposed between the first end 121a and
the second end 121c to which a flange 136 to be described
later is fixed. The first end 121a of the spindle 121 may be
inserted into the nut 125, and a bearing 150 that promotes
smooth rotation of the flange 136 to be described later and
the detection unit 140 for sensing a load applied to the
spindle 121 and measuring an engaging force between the
disc and the brake pads 10 may be disposed on the second
end 121c.

The nut 125 may be formed in a hollow cylindrical shape
so that the first end 121a of the spindle 121 is inserted
therein, and an internal thread 126 that meshes with the
external thread 122 of the spindle 121 through balls (not
shown) may be formed on an inner circumferential surface
of the nut. Furthermore, the adjusting screw 131 to be
described later may be provided on an outer side of the nut
125 to surround at least a portion of an outer circumferential
surface of the nut 125. The outer circumferential surface of
the nut 125 may be provided with an anti-rotation surface
125a at least a portion of which is formed in a flat surface
to prevent relative rotation with the adjusting screw 131.
Because the ball-screw type power transmission device is a
well-known technology that is already widely applied, a
detailed description of operation thereof will be omitted.

The actuator (not shown) may include a motor and a
reducer having a plurality of reduction gears, and may
receive power from a power supply disposed in the vehicle
to generate and provide a driving force. The actuator may
transmit the driving force generated by being connected to
the second end 121c of the spindle 121 to a rotational motion
of the spindle 121. The actuator may be installed on the
outside of the caliper housing 20, and the reducer may be
provided to the spindle 121 by decelerating power of the
motor by applying devices with various structures such as a
planetary gear assembly or a worm structure.

The position adjustment unit 130, by adjusting the relative
position of the piston 110 with respect to the power trans-
mission unit 120, may advance the relative position of the
piston 110 so as to compensate for wear of the brake pads 10,
or retreat the relative position of the piston 110 in order to
reduce drag phenomenon.

The position adjustment unit 130 may include the adjusting screw 131 provided on the outer side of the nut 125 and rotating together with the nut 125, the first screw thread 132 formed on an outer circumferential surface of the adjusting screw 131, the second screw thread 133 that is formed on the inner circumferential surface of the piston 110 and meshes with the first screw thread 132, and an adjuster 135 provided between the spindle 121 and the nut 125. The adjuster 135 rotates the nut 125 and the adjusting screw 131 in the first direction by the rotation of the spindle 121 to advance the relative position of the piston 110 or rotates the nut 125 and the adjusting screw 131 in the second direction opposite to the first direction to retreat the relative position of the piston 110.

Here, the first direction rotation of the nut 125 or the adjusting screw 131 described below is the same rotational direction as the first direction rotation of the spindle 121 described above, and refers to a rotational direction in which the piston 110 is advanced by the rotation of the adjusting screw 131. Furthermore, the second direction rotation of the nut 125 or the adjusting screw 131, which is a rotation in the opposite direction to the first direction, is the same rotational direction as the second direction rotation of the spindle 121 described above, and refers to a rotational direction in which the piston 110 is reversed by the rotation of the adjusting screw 131.

The adjusting screw 131 is provided so as to surround a front side of the nut 125, and is provided with the first screw thread 132 formed on an outer circumferential surface thereof. The adjusting screw 131 may rotate together with the nut 125, and at the same time, may be formed an anti-rotation surface 131*a* in which at least a portion of the inner circumferential surface in contact with the nut 125 is formed as a flat surface so as to prevent relative rotation. When the nut 125 is rotated by the adjuster 135 to be described later, the adjusting screw 131 may transmit the rotational force of the nut 125 to the piston 110 while rotating together with the nut 125. Because the adjusting screw 131 is provided interposed between the nut 125 and the piston 110, the adjusting screw 131 may absorb a load generated when the nut 125 and the piston 110 contact, thereby preventing deformation and wear of components such as the nut 125 and the piston 110 with large loads.

The first screw thread 132 may be formed on the outer circumferential surface of the adjusting screw 131, the second screw thread 133 may be formed on the inner circumferential surface of the piston 110, and the first and second screw threads 132 and 133 are provided by meshing with each other. As such, because the adjusting screw 131 and the piston 110 that rotate and linearly move together with the nut 125 are screw-coupled to each other, the nut 125, the adjusting screw 131, and the piston 110, which are linearly moved together, may move forward together during braking of a general vehicle, or may move backward together during braking release of a vehicle. At the same time, because the piston 110 and the adjusting screw 131 may rotate relative to each other, the piston 110 according to the rotation of the nut 125 and the adjusting screw 131 in the first direction may move forward relatively with respect to the nut 125 or the spindle 121, and the piston 110 according to the rotation of the nut 125 and the adjusting screw 131 in the second direction, which is opposite to the first direction, may move backward relatively with respect to the nut 125 or the spindle 121.

The adjuster 135 may cause the rotation of the nut 125 and the adjusting screw 131 to advance or retreat the relative position of the piston 110 with respect to the nut 125. The adjuster 135 may include a flange 136 that is fixed to the central portion 121*b* of the spindle 121 and is formed to expand in a radial direction thereof, a first protrusion 137 protruding from a front surface (a left side based on FIG. 2) of the flange 136, a second protrusion 138 that is protruded from an rear surface (a right side based on FIG. 2) of the nut 125 and is caught by the first protrusion 137 to induce and generate the first direction rotation of the nut 125 and the adjusting screw 131 when the spindle 121 rotates in the first direction, and a third protrusion 139 that is protruded from front surface (a left side based on FIG. 2) of the flange 136 and is caught by the second protrusion 138 to induce and generate the second direction rotation of the nut 125 and the adjusting screw 131 when the spindle 121 rotates in the second direction.

The flange 136 is radially extended to the central portion 121*b* of the spindle 121, and is fixed to the spindle 121 to rotate integrally with the spindle 121. The first and third protrusions 137 and 139, which will be described later, may be formed to protrude from the front surface (the left side based on FIG. 2) of the flange 136 by being spaced apart from each other at a predetermined angle. A bearing 150 that promotes smooth rotation of the flange 136 and prevents abrasion between the flange 136 and surrounding components may be provided on the rear surface (the right side based on FIG. 2).

The first and third protrusions 137 and 139 are formed to protrude from the front surface (the left side based on FIG. 2) of the flange 136 opposite to the nut 125, and may rotate about the spindle 121 as an axis together with the flange 136 when the spindle 121 rotates. The second protrusion 138 is formed to protrude from the rear surface (the right side based on FIG. 2) of the nut 125 opposite to the flange 136, and may be caught by the first protrusion 137 or the third protrusion 139 to induce the rotation of the nut 125 and the adjusting screw 131.

FIG. 4 is a cross-sectional view taken along A-A' direction of FIG. 2, and shows positions of the first to third protrusions 137, 138, and 139 in a before braking state or in a braking release state of the vehicle. Referring to FIG. 4, the first and third protrusions 137 and 139 provided on the front surface of the flange 136 are formed to protrude at an angle spaced apart from each other, and the second protrusion 138 provided on the rear surface of the nut 125 may be disposed therebetween.

More specifically, an angle between the first protrusion 137 on the front side of the flange 136 and the second protrusion 138 on the rear side of the nut 125 (hereinafter referred to as a first angle) in a before braking state or in a braking release state of the vehicle is provided to be greater than an rotation angle of the first protrusion 137 (see FIG. 6, hereinafter referred to as a second angle) from the braking release state of the vehicle to the braking state of the vehicle. When the second angle ② is provided larger than the first angle ①, the second protrusion 138 is caught by the first protrusion 137 even when a general vehicle is braked to cause the nut 125 and the adjusting screw 131 to be rotated in the first direction. Accordingly, the relative position of the piston 110 with respect to the nut 125 or the spindle 121 advances to increase rapidly an engaging force between the piston 110 and the pad plates, so that a braking force of the vehicle is greater than a driver's braking demand, and further, driving stability and fuel efficiency of the vehicle may be deteriorated due to the occurrence of a drag phenomenon. Accordingly, by providing the first angle ① larger than the second angle ②, it is possible to prevent the first protrusion 137 and the second protrusion 138 from contacting each other during general vehicle braking, and thus, the relative position of the piston 110 with respect to the nut 125 or the spindle 121 may be constantly maintained to promote braking operability and driving stability of a driver.

Furthermore, in the braking state of the vehicle, an angle between the second protrusion 138 on the rear side of the nut 125 and the third protrusion 139 on the front side of the flange 136 (see FIG. 6, hereinafter referred to as a third angle) is provided to be greater than an rotation angle of the third protrusion 139 (see FIGS. 4 and 6, hereinafter referred to as a fourth angle) from the braking state of the vehicle to the braking release state of the vehicle. When the fourth angle ④ is greater than the third angle ③, the second protrusion 138 is caught by the third protrusion 139 even when braking of a general vehicle is released to cause the nut 125 and the adjusting screw 131 to be rotated in the second direction. Accordingly, the relative position of the piston 110 with respect to the nut 125 or the spindle 121 is retreated to reduce the engaging force between the piston 110 and the pad plates, so that the braking force of the vehicle acts smaller than the driver's braking demand, leading to a safety accident. Accordingly, by providing the third angle ③ larger than the fourth angle ④, it is possible to prevent the second protrusion 138 and the third protrusion 139 from contacting each other when braking of a general vehicle is released, and thus, the relative position of the piston 110 with respect to the nut 125 or the spindle 121 may be constantly maintained to promote braking operability and driving stability of the driver.

The detection unit 140 is provided to detect adhesion force or engaging force between the disc and the brake pads 10. The detection unit 140 may be provided as a force sensor that detects the load of the spindle 121 or the actuator to measure the engaging force between the disc and the brake pads 10, but is not limited thereto. The detection unit 140 may transmit information on the detected engaging force of the brake pad 10 to the ECU, and the ECU may determine wear or drag of the brake pads 10 based on the information on the engaging force detected by the detection unit 140.

Hereinafter, an operation method of the electromechanical brake 100 system according to an embodiment of the disclosure will be described.

FIG. 5 is a lateral cross-sectional view illustrating the operation of the electromechanical brake 100 according to an embodiment of the disclosure in the braking state of the vehicle, and FIG. 6 is a cross-sectional view taken along B-B' direction of FIG. 5, showing the positions of the second protrusion 138 and the third protrusion 139.

Referring to FIGS. 2 and 4 to 6, during general braking that does not enter a first mode or a second mode to be described later, such as a service brake or parking brake of the vehicle, the electromechanical brake system may operate from the braking release state as shown in FIGS. 2 and 4 to the braking state as shown in FIGS. 5 and 6.

More specifically, when a driver applies an effort force to a brake pedal (not shown) to brake the vehicle, a pedal displacement sensor (not shown) detects a driver's intention to brake as an electrical signal and transmits the detected electric signal to the ECU. The ECU, based on the electrical signal, may control the operation of the actuator so that the disc and the brake pad 10 come into close contact to each other, thereby implementing braking of the vehicle.

When the vehicle is braked, the spindle 121 rotates in the first direction by the operation of the actuator, and in turn the nut 125 advances according to the rotation of the spindle 121 in the first direction, so that the piston 110 also advances toward the pad plate. As the brake pad 10 mounted on the pad plate approaches and closely adheres to the disc, the engaging force is generated, thereby causing the vehicle to be braked.

At this time, the first protrusion 137 provided on the flange 136 of the spindle 121 rotates by the second angle ② from the braking release state of the vehicle to the braking state of the vehicle according to the rotation of the spindle 121 in the first direction. However, because the first angle ① between the first protrusion 137 of the flange 136 and the second protrusion 138 of the nut 125 is provided larger than the second angle in the braking release state of the vehicle, the first protrusion 137 of the flange 136 and the second protrusion 138 of the nut 125 do not contact each other in the general braking situation. Accordingly, the relative position of the piston 110 with respect to the nut 125 or the spindle 121 may be constantly maintained.

When braking of the vehicle is released, the electromechanical brake system may operate from the braking state as shown in FIGS. 5 and 6 to the braking release state as shown in FIGS. 2 and 4. More specifically, the spindle 121 rotates in the second direction by the operation of the actuator, and in turn the nut 125 retreats according to the rotation of the spindle 121 in the second direction, so that the piston 110 is also spaced apart from and retreated from the pad plate. As the brake pad 10 mounted on the pad plate is spaced apart from the disk, thereby releasing braking of the vehicle. The first protrusion 137 provided on the flange 136 of the spindle 121 returns to its original position according to the rotation of the spindle 121 in the second direction.

Hereinafter, the first mode in which the electromechanical brake 100 according to an embodiment of the disclosure compensates for wear of the brake pad 10 will be described so that braking performance of the vehicle may be maintained despite wear of the brake pad 10.

In response to that the adhesion force or engaging force between the disc and the brake pad 10 measured by the sensor 140 in the braking state of the vehicle is less than a predetermined normal range value, the ECU determines that wear of the brake pad 10 presents and may enter the first mode for compensating it.

FIG. 7 is a lateral cross-sectional view illustrating an operation of the electromechanical brake 100 according to an embodiment of the disclosure in the first mode state for compensating for wear of the brake pad 10, and FIG. 8 is a cross-sectional view taken along C-C' direction of FIG. 7, showing the positions of the first, second, and third protrusions 137, 138, and 139 in the first mode state.

Referring to FIGS. 7 and 8, the ECU rotates the spindle 121 in the first direction by controlling the operation of the actuator so as to enter the first mode. At this time, the ECU generates an additional first direction rotation (exceeding the first angle in FIG. 4) that is more than the first direction rotation (see the second angles of FIGS. 5 and 6) of the spindle 121 for the general braking state. As a result, the first protrusion 137 provided on the flange 136 of the spindle 121 is rotated while contacting with the second protrusion 138 provided on the nut 125. Because the second protrusion 138 is caught by the first protrusion 137 to rotate together in the first direction, the nut 125 and the adjusting screw 131 also rotate in the first direction. The relative position of the piston 110 with respect to the nut 125 may advance by the first direction rotation of the nut 125 and the adjusting screw 131, thereby compensating for wear of the brake pad 10.

After completion of the first mode for compensating for wear of the brake pad 10, the electromechanical brake 100 according to an embodiment of the disclosure returns to the braking release state or before braking state of the vehicle.

FIG. 9 is a lateral cross-sectional view illustrating an operation of the electromechanical brake 100 according to an embodiment of the disclosure in the braking release state of the vehicle after the first mode, and FIG. 10 is a cross-sectional view taken along D-D' direction of FIG. 9, showing the positions of the first, second, and third protrusions 137, 138, and 139 are shown in the braking release state of the vehicle after the first mode.

Referring to FIGS. 9 and 10, after compensating for wear of the brake pad 10 through the first mode, the ECU controls the operation of the actuator to generate the second direction rotation of the spindle 121. More specifically, as shown in FIGS. 2 and 4, the actuator rotates the spindle 121 in the second direction to return the braking release state or the before braking state of the vehicle. As described above, although the additional first direction rotation of the spindle 121 occurs in the first mode, the ECU rotates the spindle 121 in the second direction by an amount corresponding to the amount of the additional first direction rotation generated in the first mode, so that the spindle 121 and the nut 125 may return to their original positions.

As the spindle 121 returned to its original position after performing the first mode rotates by the second angle when the vehicle is braked again, the braking operation is performed in a state that the relative position of the piston 110 with respect to the spindle 121 or the nut 125 is compensated for wear of the brake pad 10, thereby performing stably braking of the vehicle.

Hereinafter, an operation in which the electromechanical brake 100 according to an embodiment of the disclosure performs the second mode so as to reduce a drag phenomenon in which the piston 110 does not quickly return to its original position after the braking operation of the vehicle will be described.

In response to that the adhesion force or engaging force between the disc and the brake pad 10 measured by the sensor 140 in the braking release state of the vehicle is greater than a predetermined normal range value, the ECU determines that the drag phenomenon presents in which the piston 110 does not return to its original position, and may enter the second mode.

FIG. 11 is a lateral cross-sectional view illustrating an operation of the electromechanical brake 100 according to an embodiment of the disclosure in the second mode state for reducing drag, and FIG. 12 is a cross-sectional view taken along E-E' direction of FIG. 11, showing the positions of the first, second, and third protrusions 137, 138, and 139 in the second mode state.

Referring to FIGS. 11 and 12, the ECU rotates the spindle 121 in the second direction by controlling the operation of the actuator so as to enter the second mode. At this time, the ECU generates an additional second direction rotation (exceeding the third angle in FIG. 4) that is more than the second direction rotation of the spindle 121 for the general braking release state, so that the third protrusion 139 provided on the flange 136 of the spindle 121 is caught by the second protrusion 138 provided on the nut 125. As the second protrusion 138 is caught by the third protrusion 139 to rotate together in the second direction, the nut 125 and the adjusting screw 131 also rotate in the second direction. The relative position of the piston 110 with respect to the nut 125 may be retreated by the second direction rotation of the nut 125 and the adjusting screw 131, so that the piston 110 is spaced apart from the pad plate to reduce the drag.

Hereinafter, an electromechanical brake according to a modified embodiment of the disclosure will be described.

The description of the electric mechanical brake according to the modified embodiment of the disclosure to be described below is the same as the electric mechanical brake 100 according to the embodiment of the disclosure described above, except for cases where additional reference numerals are used to describe the electromechanical brake according to the modified embodiment of the disclosure, and thus the description thereof will be omitted to prevent duplication of contents.

FIG. 13 is an enlarged lateral cross-sectional view illustrating a main part of the electromechanical brake 100 according to the modified embodiment of the disclosure. Referring to FIG. 13, a release spring 210 may be provided between the first protrusion 137 and the second protrusion 138 of the adjuster 135.

The release spring 210 has one end supported by the first protrusion 137 and the other end supported by the second protrusion 138, so that the release spring 210 may be compressed between the first protrusion 137 and the second protrusion 138 by the first direction rotation of the spindle 121 during the braking operation of the general vehicle. After the nut 125 and the piston 110 advance for the braking operation of the vehicle to cause the disc and the brake pad 10 come into close contact with each other, when the actuator malfunctions or the power supply is cut off, braking of the vehicle is required to self-release in order to promote a safety of the passengers. For example, during the braking operation of the vehicle, the release spring 210 is compressed as the first protrusion 137 and the second protrusion 138 are close to each other, but when the operation of the actuator is stopped, the first protrusion 137 is pressed to its original position by an elastic restoring force of the release spring 210. Accordingly, the second direction rotation of the spindle 121 occurs and the nut 125 and the spindle 121 retreat, thereby releasing braking of the vehicle.

The release spring 210 may be provided as a coil spring as shown in FIG. 13, but is not limited thereto, and may be provided with devices of various materials and structures as long as both ends thereof are supported by the first and second protrusions 137 and 138 and the release spring is compressed during braking of the vehicle to generate elastic restoring force.

The invention claimed is:

1. An electromechanical brake, comprising:

a piston configured to advance and retreat to press a brake pad;

a power transmission unit configured to receive a driving force from an actuator to convert a rotational motion into a linear motion, and provide the converted driving force to the piston; and a position adjustment unit configured to adjust a relative position of the piston with respect to the power transmission unit;

wherein the power transmission unit comprises:

a spindle rotating by receiving the driving force from the actuator, and a nut connected to the spindle, configured to move forward by rotation of the spindle in a first direction to advance the piston, and to move backward by rotation of the spindle in a second direction to retreat the piston, wherein the position adjustment unit comprises:

an adjusting screw provided on an outer side of the nut and rotating together with the nut, a first screw thread formed on an outer circumferential surface of the adjusting screw,

13 a second screw thread formed on an inner circumferential surface of the piston and meshing with the first screw thread, and an adjuster provided between the spindle and the nut and configured to rotate the nut and the adjusting screw in the first direction or the second direction by rotation of the spindle to advance and retreat the relative position of the piston, wherein the adjuster includes:

a flange extending radially on an outer circumferential surface of the spindle, a first protrusion protruding from the flange, and a second protrusion protruding from the nut and configured to induce and generate the first direction rotation of the nut and the adjusting screw by being caught by the first protrusion when the spindle rotates in the first direction, thereby advancing the relative position of the piston.

2. The electromechanical brake of claim 1, wherein a first angle between the first projection and the second projection in a braking release state of a vehicle is provided to be greater than a second angle at which the first protrusion rotates from the braking release state to a braking state of the vehicle.

3. The electromechanical brake of claim 1, wherein the adjuster further includes a third protrusion protruding from the flange, wherein the second protrusion is configured to induce the second direction rotation of the nut and the adjusting screw by being caught by the third protrusion when the spindle rotates in the second direction, thereby retreating the relative position of the piston.

4. The electromechanical brake of claim 3, wherein a third angle between the second protrusion and the third protrusion in a braking state of the vehicle is provided to be greater than a fourth angle at which the third protrusion rotates from the braking state to the braking release state of the vehicle.

5. The electromechanical brake of claim 2, wherein the nut includes an internal thread formed on an inner circumferential surface thereof, the spindle includes a first end on one side of which an external thread meshing with the internal thread is formed on the outer circumferential surface thereof, a second end on the other side connected to the actuator, and a central portion disposed between the first end and the second end, and the flange is fixedly installed on an outer circumferential surface of the central portion.

6. The electromechanical brake of claim 5, wherein the first protrusion and the third protrusion are formed to protrude to be spaced apart from each other on a front surface of the flange opposite to the nut, and the second protrusion is formed to protrude from a rear surface of the nut opposite to the front surface of the flange.

7. An electromechanical brake, comprising:

a piston configured to advance and retreat to press a brake pad;

a power transmission unit configured to receive a driving force from an actuator to convert a rotational motion into a linear motion, and provide the converted driving force to the piston; and a position adjustment unit configured to adjust a relative position of the piston with respect to the power transmission unit;

wherein the power transmission unit comprises:

a spindle rotating by receiving the driving force from the actuator, and a nut connected to the spindle, configured to move forward by rotation of the spindle in a first direction to advance the piston, and to move backward by rotation of the spindle in a second direction to retreat the piston, wherein the position adjustment unit comprises:

an adjusting screw provided on an outer side of the nut and rotating together with the nut, a first screw thread formed on an outer circumferential surface of the adjusting screw, a second screw thread formed on an inner circumferential surface of the piston and meshing with the first screw thread, and an adjuster provided between the spindle and the nut and configured to rotate the nut and the adjusting screw in the first direction or the second direction by rotation of the spindle to advance and retreat the relative position of the piston, wherein the adjusting screw is provided in a hollow cylindrical shape to surround a portion of an outer side of the nut, and each of the adjusting screw and the nut is provided with anti-rotation surface in which at least a portion of a part in contact with each other is provided as a flat surface.

8. The electromechanical brake of claim 1, further comprising a release spring has one end supported by the first protrusion and the other end supported by the second protrusion, the release spring configured to be compressed by the first direction rotation of the spindle.

9. The electromechanical brake of claim 3, further comprising an electronic control unit configured to control operation of the actuator; and a detection unit configured to detect an engaging force between the brake pad and the disk rotating together with a wheel.

10. A method of operating the electromechanical brake according to claim 9, the method comprising:

in response to that the engaging force between the disc and the brake pad detected by the detection unit in a braking state of the vehicle is less than a predetermined value, determining, by the electronic control unit, that wear of the brake pad presents, and entering, by the electronic control unit, a first mode for advancing the relative position of the piston.

11. The method of claim 10, further comprising:

in response to that the engaging force between the disc and the brake pad detected by the detection unit in a braking release state of the vehicle is greater than a predetermined value, determining, by the electronic control unit, that the a drag presents, and entering, by the electronic control unit, a second mode for retreating the relative position of the piston.

12. The method of claim 10, further comprising:

in the first mode, by the electronic control unit, controlling the operation of the actuator to rotate the spindle in a first direction from a braking release state of the vehicle to a braking state of the vehicle, generating an additional first direction rotation of the spindle to cause the first projection to be rotated while contacting with the second projection, thereby inducing the first direction rotation of the nut and the adjusting screw, and advancing the relative position of the piston with respect to the nut by the first direction rotation of the adjusting screw.

13. The method of claim 12, further comprising:

after the first mode, returning, by the electronic control unit, the spindle or the first protrusion to its original position of the braking release state of the vehicle.

14. The method of claim 11, further comprising:

in the second mode, by the electronic control unit, controlling the operation of the actuator to rotate the spindle in a second direction from a braking state of the vehicle to a braking release state of the vehicle, generating an additional second direction rotation of the spindle to cause the third projection to be rotated while contacting with the second projection, thereby inducing the second direction rotation of the nut and the adjusting screw, and retreating the relative position of the piston with respect to the nut by the second direction rotation of the adjusting screw.

\* \* \* \* \*